(12) United States Patent
Bajo

(10) Patent No.: US 8,351,728 B2
(45) Date of Patent: Jan. 8, 2013

(54) DIGITAL IMAGE FILTER PROCESSING

(75) Inventor: Allison Bajo, Carson, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 482 days.

(21) Appl. No.: 12/748,226

(22) Filed: Mar. 26, 2010

(65) Prior Publication Data

US 2011/0235937 A1    Sep. 29, 2011

(51) Int. Cl.
*G06K 9/40* (2006.01)
(52) U.S. Cl. .................. 382/261; 382/260; 382/266
(58) Field of Classification Search ........... 382/260–266
See application file for complete search history.

(56) References Cited

U.S. PATENT DOCUMENTS

| 6,711,301 B1 * | 3/2004 | Tran et al. ............ 382/260 |
| 7,120,311 B2 | 10/2006 | Snyder |
| 7,400,781 B2 * | 7/2008 | Kyo ............ 382/276 |

\* cited by examiner

*Primary Examiner* — Wesley Tucker
(74) *Attorney, Agent, or Firm* — Fitzpatrick, Cella, Harper & Scinto

(57) ABSTRACT

Filter processing is performed on an image, in which a filter kernel having coefficients corresponding to positions of pixels is applied at a target pixel position and to sample pixels positioned in the neighborhood of the target pixel position. A bin is assigned to each unique coefficient of the filter kernel. A mask having respective positions corresponding to the positions of the filter kernel is created. Each respective position of the mask indexes to the bin for the coefficient corresponding to that position. The mask is positioned at the target pixel position, and the respective pixel value of each sample pixel is accumulated in the bin corresponding to the position of the sample pixel in the mask. The accumulated pixel values in each respective bin are multiplied by the coefficient corresponding to the bin. The resultant products are summed to determine a filtered pixel value at the target pixel position.

30 Claims, 5 Drawing Sheets

DIGITAL IMAGE FILTER PROCESSING

FIELD

The present disclosure relates to digital image filter processing, and more particularly relates to digital image filter processing using sample pixels positioned in the neighborhood of a target pixel.

BACKGROUND

Filter processing is the application of a two dimensional data set of coefficients over a sampling area of an input image. Filter processing allows various effects to be applied on images, such as blurring, sharpening, or removing noise.

One method of applying a filter to an image is to use sample pixels surrounding a target pixel to calculate a final value for the target pixel. In particular, each sample pixel is multiplied with a corresponding coefficient in the filter, based on its position in relation to the target pixel. The products of all of the sample pixels and coefficients are summed to get the final value for the target pixel.

SUMMARY

One problem with known filtering techniques is as the size of the filter kernel increases, the number of required multiplications increases geometrically. This problem is further compounded when the filter is applied over a large image. Since multiplications are computationally expensive, the increased calculations lead to significant consumption of processing resources and substantially increased processing time.

The foregoing is addressed by accumulating pixel values at positions corresponding to each unique filter coefficient in the kernel, prior to multiplying the accumulated pixel values by the respective filter coefficient.

Thus, in an example embodiment described herein, filter processing is performed on an image, in which a filter kernel having multiple coefficients corresponding to positions of pixels is applied at a target pixel position and to sample pixels positioned in the neighborhood of the target pixel position. A bin is assigned to each unique coefficient of the filter kernel. A mask having respective positions corresponding to the positions of the filter kernel is created. Each respective position of the mask indexes to the bin for the coefficient corresponding to that position. The mask is positioned at the target pixel position, and the respective pixel value of each sample pixel is accumulated in the indexed bin corresponding to the position of the sample pixel in the mask. The accumulated pixel values in each respective bin are multiplied by the coefficient corresponding to the bin to produce a set of resultant products. The resultant products are summed to determine a filtered pixel value at the target pixel position.

By accumulating pixel values at positions corresponding to each respective filter coefficient prior to multiplying the accumulated pixel values by the respective filter coefficient, it is ordinarily possible to significantly reduce the number of multiplications required for the filter processing. Accordingly, it is ordinarily possible to increase the speed of filter processing while reducing consumption of processing resources.

In one example embodiment, the filter processing is performed by a general purpose computer which has a CPU interfaced to a GPGPU having a SIMD architecture. The filter processing is performed in parallel for all pixels of the image, using each pixel for the target pixel position.

In another example embodiment, the image includes medical image data for an anatomical feature. In yet another example embodiment, the image includes image data of a scene captured by a digital camera. The image data can also include moving image data, such as image data for a video game. Image data for such images may or may not be received over a network.

This brief summary has been provided so that the nature of this disclosure may be understood quickly. A more complete understanding can be obtained by reference to the following detailed description and to the attached drawings.

DETAILED DESCRIPTION

Figure 1:
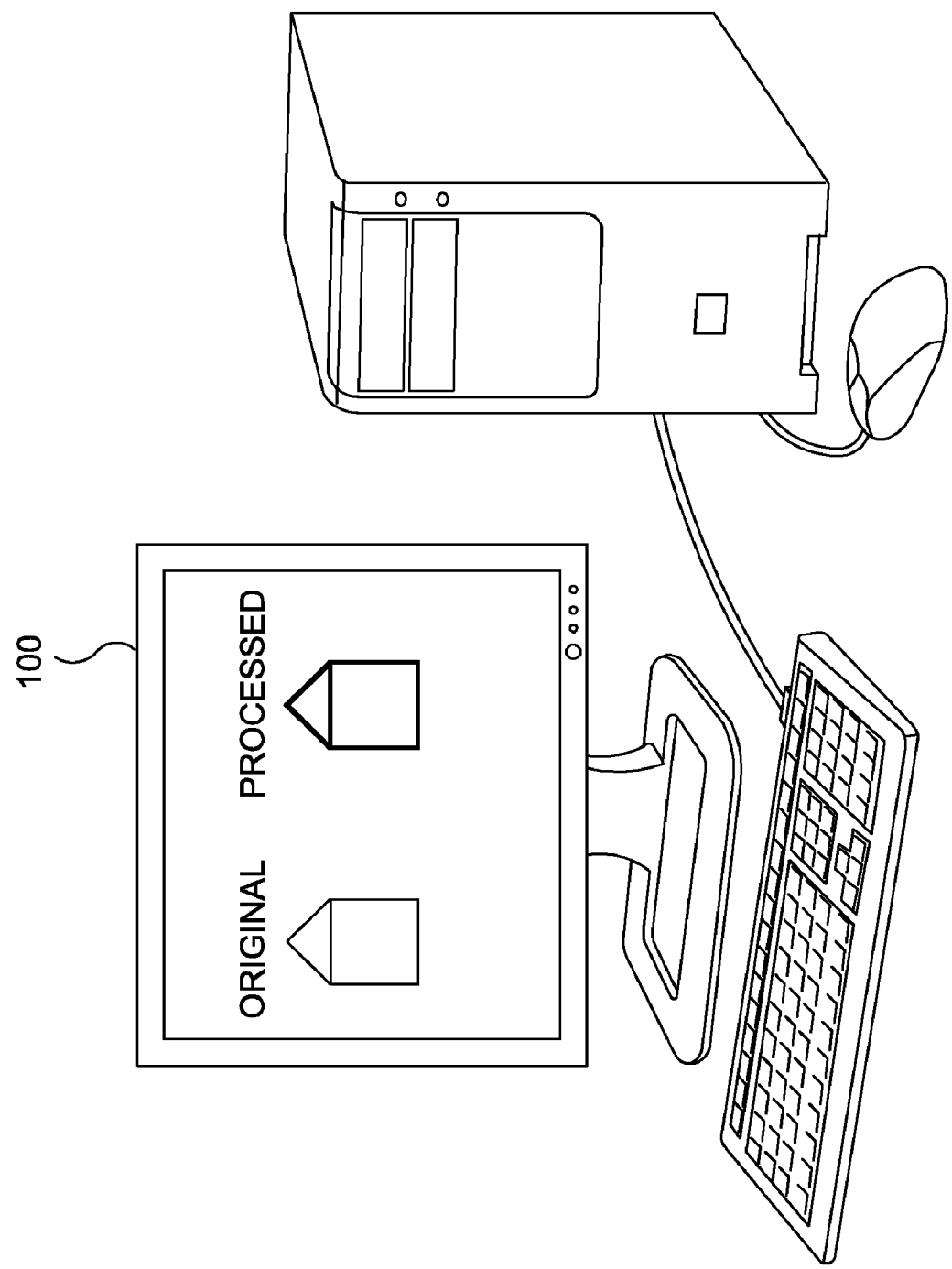
FIG. 1 illustrates an example embodiment of an environment in which aspects of the present disclosure may be practiced.

FIG. 1 illustrates an example environment in which aspects of the present disclosure may be practiced. Computer 100 generally comprises a programmable general purpose personal computer having an operating system, such as Microsoft® Windows® or Apple® Mac OS® or LINUX, and which is programmed as described below so as to perform particular functions and, in effect, become a special purpose computer when performing these functions.

As shown in FIG. 1, computer 100 depicts a simplified view of an image before and after filter processing, in which a filter kernel having multiple coefficients corresponding to positions of pixels is applied at a target pixel position and to sample pixels positioned in the neighborhood of the target pixel position. In the example shown in FIG. 1, filter processing has been applied to all pixels of the original image.

Various types of filter processing are possible, including Gaussian filters, Sobel filters and Laplace filters. For example, a Gaussian filter is a filter whose impulse response is a Gaussian function. A Sobel filter is used for edge detection and uses two spatial filters, and X-direction filter and a Y-direction filter. Another symmetric filter is a Laplace filter, which is used for edge enhancement. The Laplace filter is very symmetric and is often used to highlight edges in an image.

Generally, the filter used should be symmetrical or near-symmetrical, or have significant duplication of coefficients across the filter. The filter may be odd dimensions of 3 or greater (e.g., 5×5), although the width and height dimensions of the filter may be different. For purposes of simplicity, it should be assumed that the filter is already chosen and available at the time of filter processing according to the present disclosure.

While FIG. 1 depicts a computer, computing equipment for practicing aspects of the present disclosure can be implemented in a variety of embodiments. For example, computer 100 can be embodied as a number of devices, including, for example, a personal digital assistant (PDA), a cellular telephone, a digital camera, a digital video recorder or a portable media player, among many other embodiments.

Computer 100 also includes computer-readable memory media, such as fixed disk 45 (shown in FIG. 2), which is constructed to store computer-readable information, such as computer-executable process steps or a computer-executable program for causing computer 100 to perform filter processing on an image, as described below.

Figure 2:
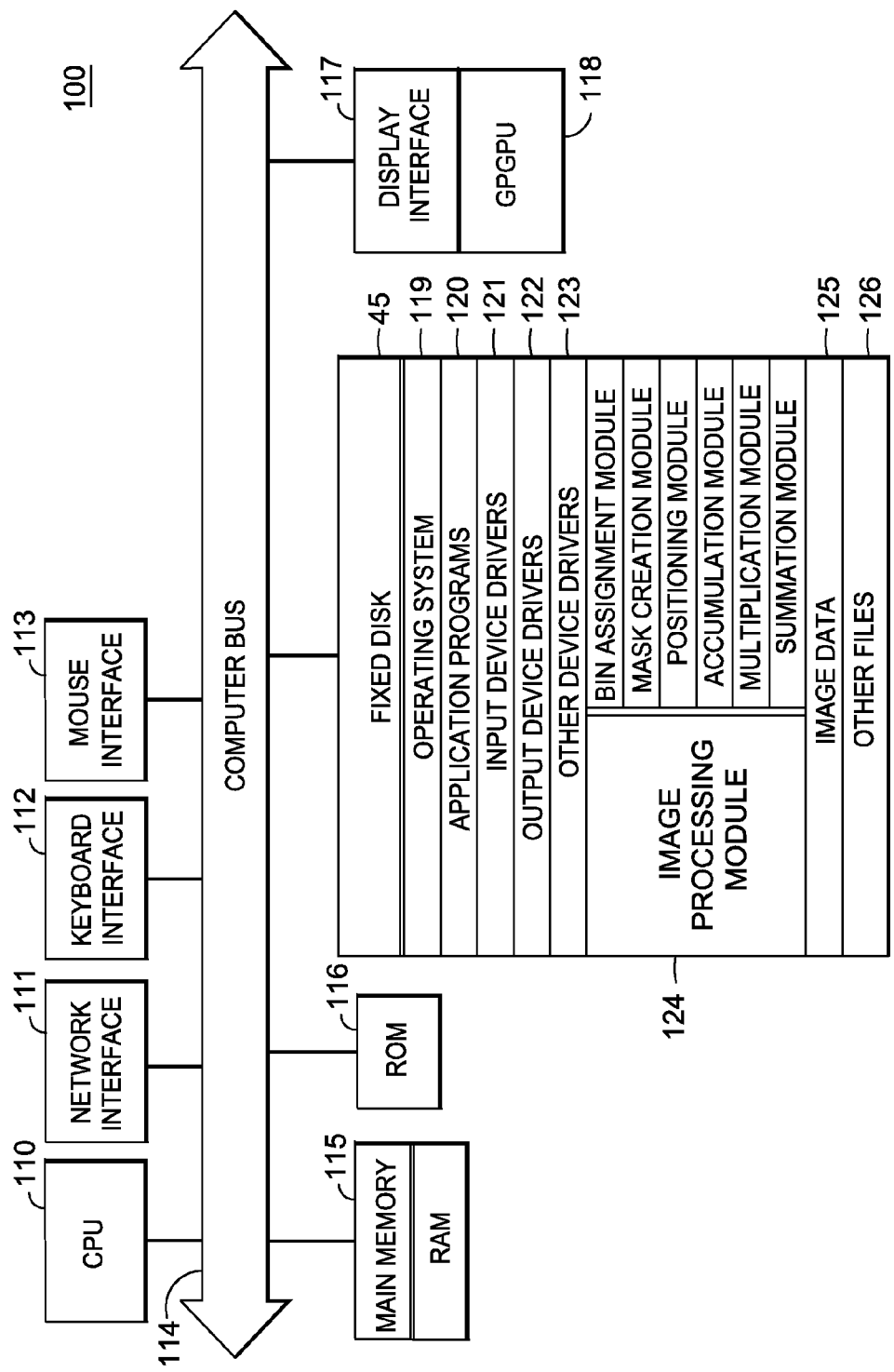
FIG. 2 is a detailed block diagram depicting the internal architecture of the computer shown in FIG. 1.

FIG. 2 is a detailed block diagram depicting the internal architecture of the computer 100 shown in FIG. 1. As shown in FIG. 2, computer 100 includes central processing unit (CPU) 110 which interfaces with computer bus 114. Also interfacing with computer bus 114 are fixed disk 45 (e.g., a hard disk or other nonvolatile storage medium), network interface 111 for accessing other devices across a network, keyboard interface 112, mouse interface 113, random access memory (RAM) 115 for use as a main run-time transient memory, read only memory (ROM) 116, and display interface 117 for a display screen or other output.

GPGPU 118 is a general-purpose graphics processing unit (GPU), a parallel-processing device that is ordinarily designed to render computer graphics, and that also performs calculations for non-graphics data traditionally handled by a CPU. GPGPU 118 may have a SIMD architecture. SIMD, short for single instruction-multiple data stream, is a type of parallel computing architecture that allows a single computer instruction to perform an identical action simultaneously on multiple pieces of data using multiple processing units.

RAM 115 interfaces with computer bus 114 so as to provide information stored in RAM 115 to CPU 110 during execution of the instructions in software programs, such as an operating system, application programs, image processing modules, and device drivers. More specifically, CPU 110 first loads computer-executable process steps from fixed disk 45, or another storage device into a region of RAM 115. CPU 110 can then execute the stored process steps from RAM 115 in order to execute the loaded computer-executable process steps. Data, such as image data 125 or filter data, or other information, can be stored in RAM 115 so that the data can be accessed by CPU 110 during the execution of the computer-executable software programs, to the extent that such software programs have a need to access and/or modify the data.

As also shown in FIG. 2, fixed disk 45 contains computer-executable process steps for operating system 119, and application programs 120, such as image management programs. Fixed disk 45 also contains computer-executable process steps for device drivers for software interface to devices, such as input device drivers 121, output device drivers 122, and other device drivers 123.

Image data 125 is available for processing, and in particular for filter processing as described below. In that regard, image data 125 may include medical image data for an anatomical feature. Image data 125 can also include image data of a scene captured by a digital camera, or artificially-rendered images, such as virtual landscapes or pictures. Image data 125 can also include moving image data, such as image data for a movie or video game. Image data 125 may or may not be received over a network. Other files 126 are available for output to output devices and for manipulation by application programs.

Image processing module 124 comprises computer-executable process steps for performing filter processing on an image, and generally comprises a number of sub-modules. More specifically, image processing module 124 is configured to perform filter processing on an image, in which a filter kernel having multiple coefficients corresponding to positions of pixels is applied at a target pixel position and to sample pixels positioned in the neighborhood of the target pixel position. This process will be described in more detail below.

The computer-executable process steps for image processing module 124 may be configured as part of operating system 119, as part of an output device driver, such as a print processing driver, or as a stand-alone application program. Image processing module 124 may also be configured as a plug-in or dynamic link library (DLL) to the operating system, device driver or application program. In one example embodiment described herein, image processing module 124 is incorporated directly into the operating system for computer 100. It can be appreciated that the present disclosure is not limited to these embodiments and that the disclosed modules may be used in other environments.

Although the sub-modules of image processing module 124 are described below as being stored on fixed disk 45 and executed by CPU 110, in another example embodiment, GPGPU 118 may perform the filter processing. Specifically, GPGPU 118 may load and execute the above sub-modules. In that regard, since the results of filter processing are ordinarily written to a new image, the processing of one pixel is ordinarily not dependent on the outcome of processing for another pixel. Accordingly, GPGPU 118 may perform filtering in parallel for all pixels of the image, using each pixel for the target pixel position. Of course, other hardware embodiments outside of a CPU interfaced with a GPGPU are possible, including an integrated circuit (IC) or other hardware, such as DIGIC units.

Figure 3:
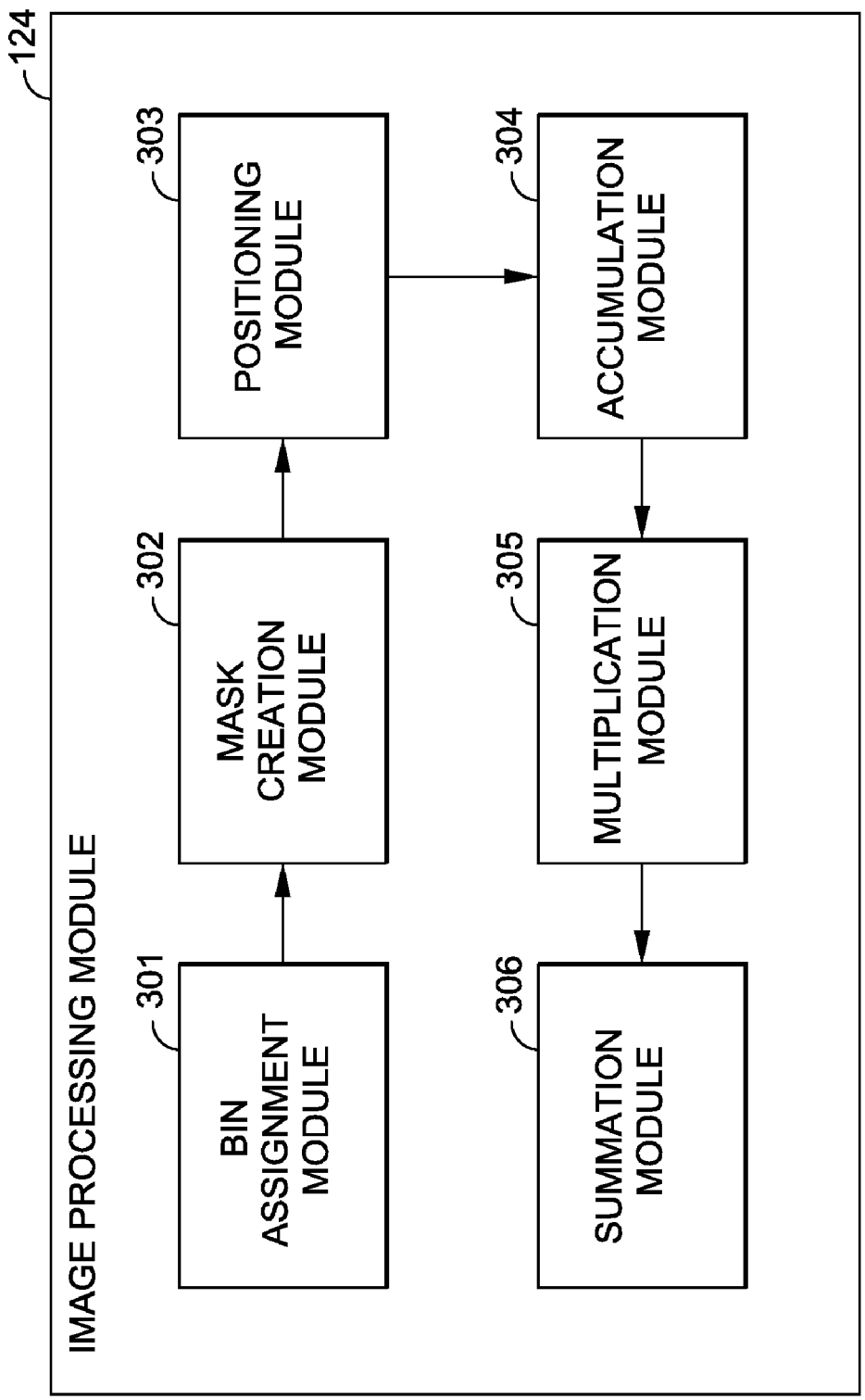
FIG. 3 is illustrates an example of an image processing module.

FIG. 3 illustrates an example of image processing module 124 in which the sub-modules of image processing module 124 are included in fixed disk 45. Each of the sub-modules are computer-executable software code or process steps executable by a processor, such as CPU 110, and are stored on a computer-readable storage medium, such as fixed disk 45 or RAM 115. More or less modules may be used, and other architectures are possible.

As shown in FIG. 3, image processing module 124 includes bin assignment module 301 for assigning a bin to each unique coefficient of the filter kernel. Image processing module 124 further includes mask creation module 302 for creating a mask having respective positions corresponding to the positions of the filter kernel, wherein each respective position of the mask indexes to the bin for the coefficient corresponding to that position. Additionally, image processing module 124 includes positioning module 303 for positioning the mask at the target pixel position. Moreover, image processing module 124 includes accumulation module 304 for accumulating the respective pixel value of each sample pixel in the indexed bin corresponding to the position of the sample pixel in the mask, and multiplication module 305 for multiplying the accumulated pixel values in each respective bin by the coefficient corresponding to the bin to produce a set of resultant products. Image processing module 124 further includes summation module 306 for summing the resultant products to determine a filtered pixel value at the target pixel position.

A process for performing filter processing on an image, in which a filter kernel having multiple coefficients corresponding to positions of pixels is applied at a target pixel position and to sample pixels positioned in the neighborhood of the target pixel position, will now be described with respect to FIGS. 4 and 5.

Figure 4:
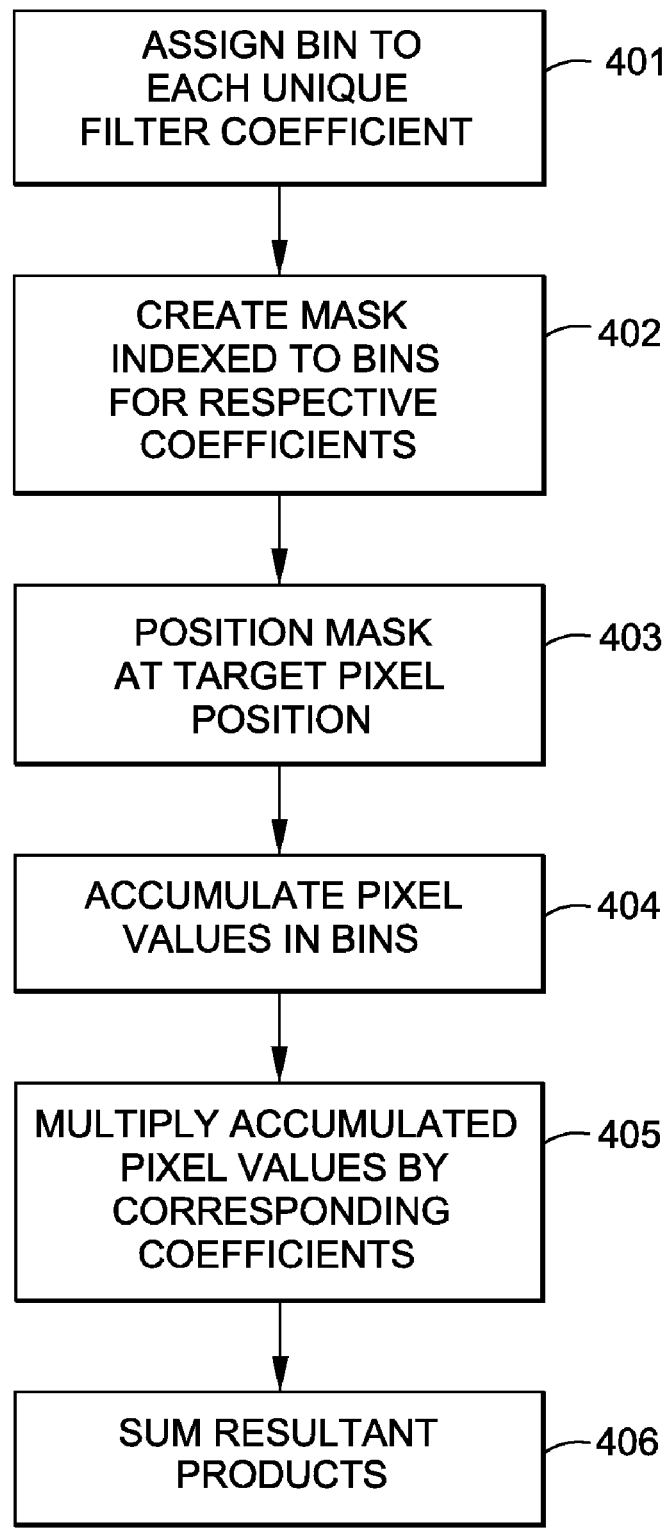
FIG. 4 is a flowchart illustrating an example process for performing filter processing on an image.

Briefly, in FIG. 4, filter processing is performed on an image, in which a filter kernel having coefficients corresponding to positions of pixels is applied at a target pixel position and to sample pixels positioned in the neighborhood of the target pixel position. A bin is assigned to each unique coefficient of the filter kernel. A mask having respective positions corresponding to the positions of the filter kernel is created. Each respective position of the mask indexes to the bin for the coefficient corresponding to that position. The mask is positioned at the target pixel position, and the respective pixel value of each sample pixel is accumulated in the bin corresponding to the position of the sample pixel in the mask. The accumulated pixel values in each respective bin are multiplied by the coefficient corresponding to the bin. The resultant products are summed to determine a filtered pixel value at the target pixel position.

In step 401, each unique coefficient of the filter is assigned a bin. In that regard, since the filter is symmetric or near-symmetric, many of the filter coefficient values are the same. For example, as shown in FIG. 5, the 81 spaces in the filter only include 15 unique coefficients, each of which is assigned a bin from [0] to [14]. Thus, each bin represents one unique coefficient.

In step 402, a mask having respective positions corresponding to the positions of the filter kernel is created. Each respective position of the mask indexes to the bin for the coefficient corresponding to that position. Thus, for example, in the mask shown in FIG. 5, the upper left corner of the mask indexes to the bin (bin [0]) for the coefficient "0.01832".

In step 403, the mask is positioned at the target pixel position. Thus, the mask is positioned such that the target pixel is at the center of the mask, and such that the remainder of the mask is at the sample pixels positioned in the neighborhood of the target pixel.

In that regard, the target pixel may be near the edge of the image such that part of the mask is outside the image. In such a case, the part of the mask outside the image can simply disregarded. Alternatively, pixel values for the part of the mask outside the image can be created by mirroring the pixel values for a corresponding part of the mask inside the image, or by using the pixel values at the edge of the image.

In step 404, the respective pixel value of each sample pixel is accumulated in the indexed bin corresponding to the position of the sample pixel in the mask. For example, in FIG. 5, the values of the pixels at positions corresponding to the four corners of the mask would be accumulated in the corresponding bin[0]. Thus, for example, if the pixel values at positions corresponding to the four corners of the mask were 2.5, 6.5, 1.0 and 3.0, these values would be accumulated in bin[0] for a total of 13.0. In one embodiment, the respective pixel values of each sample pixel are accumulated row-wise from the top left position of the mask to the bottom right position of the mask, although other methods may be used.

In step 405, the accumulated pixel values in each respective bin are multiplied by the coefficient corresponding to the bin to produce a set of resultant products. Thus, in the example of FIG. 5, the accumulated pixel values in bin [0] are multiplied by the coefficient corresponding to that bin, i.e., "0.01832".

In step 406, the products resulting from the multiplication are summed. Thus, the accumulated pixel values in each bin are summed to determine a filtered pixel value at the target pixel position.

In one example embodiment, one or more pixel values may be modified prior to accumulation of the pixel values in the respective bins. For example, in a color image, one channel out of red, green and blue (RGB) may be intensified prior to accumulating the pixel values in the bins. Of course, many other types of modifications are possible. Moreover, one or more of the resultant products can be modified prior to being summed for the final pixel value. For example, different algorithms can be applied to the products depending on the type of filter processing being performed.

Additionally, the mask may re-used for subsequent filter processing on other images as long as the subsequent filter processing does not require new filter coefficients or a new filter size. Thus, it may be possible to even further reduce processing requirements.

Figure 5:
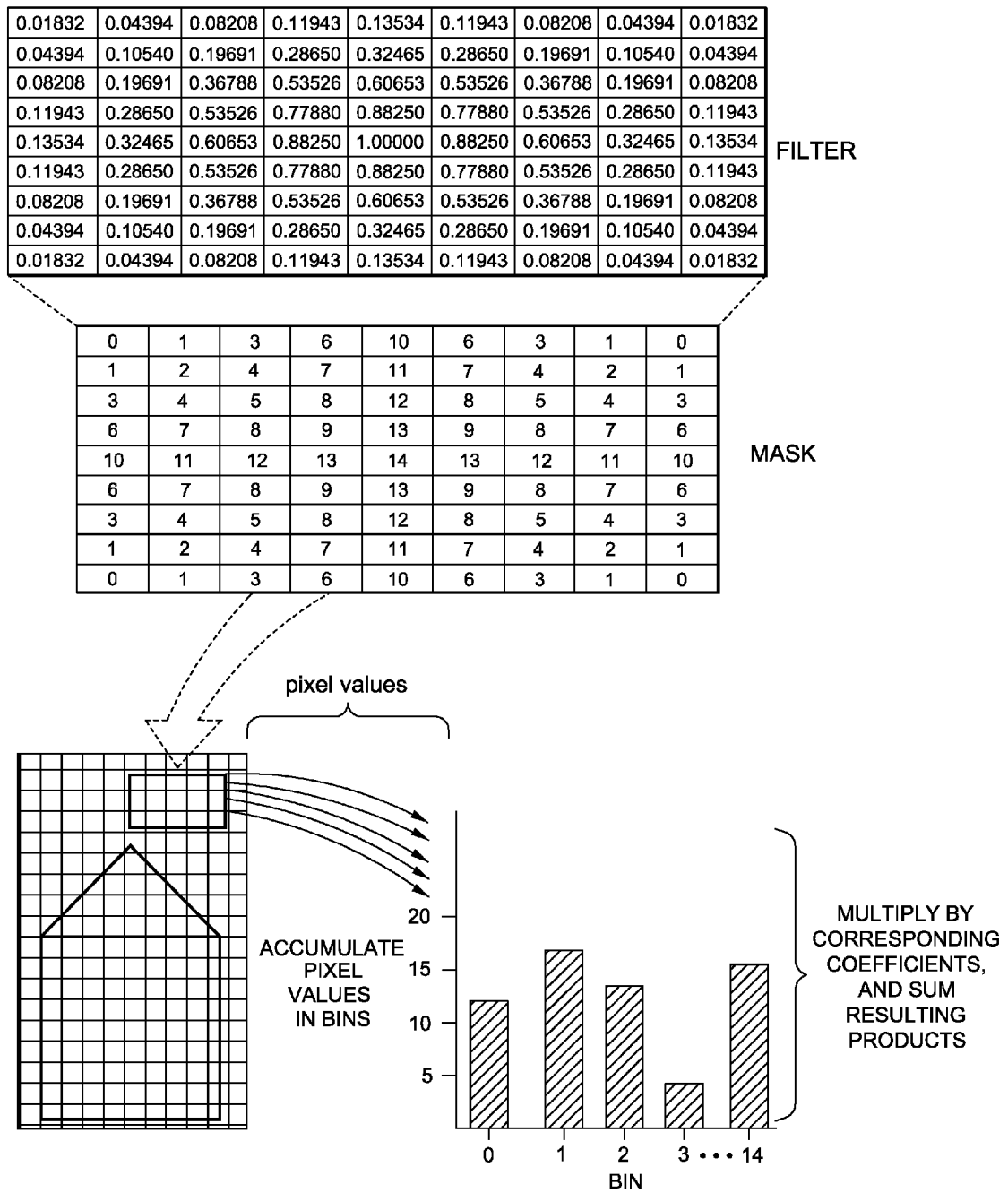
FIG. 5 is a simplified view for explaining filter processing according to the present disclosure.

FIG. 5 is a simplified view for explaining filter processing according to the present disclosure, as described above. As shown in FIG. 5, the positions of the mask correspond to the positions in the filter and index to the corresponding bin, and the pixel values at each position are accumulated in the respective bins for each coefficient prior to being multiplied by the corresponding coefficient. Thus, rather that performing 81 separate multiplications, one for each position in the filter, it is ordinarily possible to reduce the number of multiplications by first accumulating the pixel values and then performing one multiplication for each unique coefficient.

The following table shows an example comparison of the number of additions and multiplications performed using the traditional method versus as performed in the disclosure, for different sizes of Gaussian filters.

TABLE 1

| | Comparison with traditional method | | | | |
|---|---|---|---|---|---|
| | Traditional | | Disclosure | | |
| Size | Additions | Multiplications | Additions | Multiplications | % Difference |
| 3 | 8 | 9 | 11 | 3 | 37.50% −66.67% |
| 5 | 24 | 25 | 30 | 6 | 25.00% −76.00% |
| 7 | 48 | 49 | 58 | 10 | 20.83% −79.59% |
| 9 | 80 | 81 | 95 | 15 | 18.75% −81.48% |
| 11 | 120 | 121 | 140 | 20 | 16.67% −83.47% |
| 13 | 168 | 169 | 195 | 27 | 16.07% −84.02% |
| 15 | 224 | 225 | 258 | 34 | 15.18% −84.89% |
| 17 | 288 | 289 | 330 | 42 | 14.58% −85.47% |
| 19 | 360 | 361 | 411 | 51 | 14.17% −85.87% |
| 21 | 440 | 441 | 501 | 61 | 13.86% −86.17% |
| 23 | 528 | 529 | 599 | 71 | 13.45% −86.58% |
| 99 | 9800 | 9801 | 10793 | 993 | 10.13% −89.87% |

As shown, the filter processing according to the present disclosure may reduce the number of expensive multiplication calculation by a significant amount. In that regard, the corresponding increase in the "cheaper" addition calculations is ordinarily not significant enough to affect the overall performance.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for performing filter processing on an image, in which a filter kernel having multiple coefficients corresponding to positions of pixels is applied at a target pixel position and to sample pixels positioned in the neighborhood of the target pixel position, comprising:
    assigning a bin to each unique coefficient of the filter kernel;
    creating a mask having respective positions corresponding to the positions
of the filter kernel, wherein each respective position of the mask indexes to the bin for the coefficient corresponding to that position;
    positioning the mask at the target pixel position;

accumulating the respective pixel value of each sample pixel in the indexed bin corresponding to the position of the sample pixel in the mask;

multiplying the accumulated pixel values in each respective bin by the coefficient corresponding to the bin to produce a set of resultant products; and summing the resultant products to determine a filtered pixel value at the target pixel position;

wherein at least one processor performs at least one of the steps.

2. The method according to claim 1, wherein the filter used for the filter processing is a symmetrical filter.

3. The method according to claim 1, wherein the filter used for the filter processing has substantial duplication of coefficients across the filter.

4. The method according to claim 1, wherein the method is performed by a general purpose computer which has a CPU interfaced to a GPGPU having a SIMD architecture, and wherein the method is performed in parallel for all pixels of the image, using each pixel for the target pixel position.

5. The method according to claim 1, wherein in a case that the target pixel is near the edge of the image such that part of the mask is outside the image, the part of the mask outside the image is disregarded.

6. The method according to claim 1, wherein in a case that the target pixel is near the edge of the image such that part of the mask is outside the image, pixel values for the part of the mask outside the image are created by mirroring the pixel values for a corresponding part of the mask inside the image.

7. The method according to claim 1, wherein in a case that the target pixel is near the edge of the image such that part of the mask is outside the image, the pixel values for the part of the mask outside the image are created by using the pixel values at the edge of the image.

8. The method according to claim 1, wherein the respective pixel values of each sample pixel are accumulated row-wise from the top left position of the mask to the bottom right position of the mask.

9. The method according to claim 1, wherein one or more pixel values are modified prior to accumulation of the pixel values in the respective bins.

10. The method according to claim 1, wherein one or more of the resultant products are modified prior to being summed for the final pixel value.

11. The method according to claim 1, wherein the mask is re-used for subsequent filter processing on other images as long as the subsequent filter processing does not require new filter coefficients or a new filter size.

12. The method according to claim 1, wherein the image includes medical image data for an anatomical feature.

13. The method according to claim 1, wherein the image includes image data of a scene captured by a digital camera.

14. The method according to claim 1, wherein the image includes image data of a moving image for a video game.

15. An image processing apparatus for performing filter processing on an image, in which a filter kernel having multiple coefficients corresponding to positions of pixels is applied at a target pixel position and to sample pixels positioned in the neighborhood of the target pixel position, comprising:

a computer-readable memory constructed to store computer-executable process steps; and a processor constructed to execute the computer-executable process steps stored in the memory;

wherein the process steps stored in the memory cause the processor to:

assign a bin to each unique coefficient of the filter kernel;

create a mask having respective positions corresponding to the positions of the filter kernel, wherein each respective position of the mask indexes to the bin for the coefficient corresponding to that position;

position the mask at the target pixel position;

accumulate the respective pixel value of each sample pixel in the indexed bin corresponding to the position of the sample pixel in the mask;

multiply the accumulated pixel values in each respective bin by the coefficient corresponding to the bin to produce a set of resultant products; and sum the resultant products to determine a filtered pixel value at the target pixel position.

16. The apparatus according to claim 15, wherein the filter used for the filter processing is a symmetrical filter.

17. The apparatus according to claim 15, wherein the filter used for the filter processing has substantial duplication of coefficients across the filter.

18. The apparatus according to claim 15, wherein the method is performed by a general purpose computer which has a CPU interfaced to a GPGPU having a SIMD architecture, and wherein the method is performed in parallel for all pixels of the image, using each pixel for the target pixel position.

19. The apparatus according to claim 15, wherein in a case that the target pixel is near the edge of the image such that part of the mask is outside the image, the part of the mask outside the image is disregarded.

20. The apparatus according to claim 15, wherein in a case that the target pixel is near the edge of the image such that part of the mask is outside the image, pixel values for the part of the mask outside the image are created by mirroring the pixel values for a corresponding part of the mask inside the image.

21. The apparatus according to claim 15, wherein in a case that the target pixel is near the edge of the image such that part of the mask is outside the image, the pixel values for the part of the mask outside the image are created by using the pixel values at the edge of the image.

22. The apparatus according to claim 15, wherein the respective pixel values of each sample pixel are accumulated row-wise from the top left position of the mask to the bottom right position of the mask.

23. The apparatus according to claim 15, wherein one or more pixel values are modified prior to accumulation of the pixel values in the respective bins.

24. The apparatus according to claim 15, wherein one or more of the resultant products are modified prior to being summed for the final pixel value.

25. The apparatus according to claim 15, wherein the mask is re-used for subsequent filter processing on other images as long as the subsequent filter processing does not require new filter coefficients or a new filter size.

26. The apparatus according to claim 15, wherein the image includes medical image data for an anatomical feature.

27. The apparatus according to claim 15, wherein the image includes image data of a scene captured by a digital camera.

28. The apparatus according to claim 15, wherein the image includes image data of a moving image for a video game.

29. An image processing module stored on a non-transitory computer readable storage medium for performing filter processing on an image, in which a filter kernel having multiple coefficients corresponding to positions of pixels is applied at a target pixel position and to sample pixels positioned in the neighborhood of the target pixel position, comprising:

a bin assignment module assigning a bin to each unique coefficient of the filter kernel;

a mask creation module for creating a mask having respective positions corresponding to the positions of the filter kernel, wherein each respective position of the mask indexes to the bin for the coefficient corresponding to that position;

a positioning module for positioning the mask at the target pixel position;

an accumulation module for accumulating the respective pixel value of each sample pixel in the indexed bin corresponding to the position of the sample pixel in the mask;

a multiplication module for multiplying the accumulated pixel values in each respective bin by the coefficient corresponding to the bin to produce a set of resultant products; and a summation module for summing the resultant products to determine a filtered pixel value at the target pixel position.

30. A non-transitory computer-readable storage medium storing computer-executable process steps for causing a computer to perform a method for performing filter processing on an image, in which a filter kernel having multiple coefficients corresponding to positions of pixels is applied at a target pixel position and to sample pixels positioned in the neighborhood of the target pixel position, the method comprising:

assigning a bin to each unique coefficient of the filter kernel;

creating a mask having respective positions corresponding to the positions of the filter kernel, wherein each respective position of the mask indexes to the bin for the coefficient corresponding to that position;

positioning the mask at the target pixel position;

accumulating the respective pixel value of each sample pixel in the indexed bin corresponding to the position of the sample pixel in the mask;

multiplying the accumulated pixel values in each respective bin by the coefficient corresponding to the bin to produce a set of resultant products; and summing the resultant products to determine a filtered pixel value at the target pixel position.

\* \* \* \* \*